Figure 1:
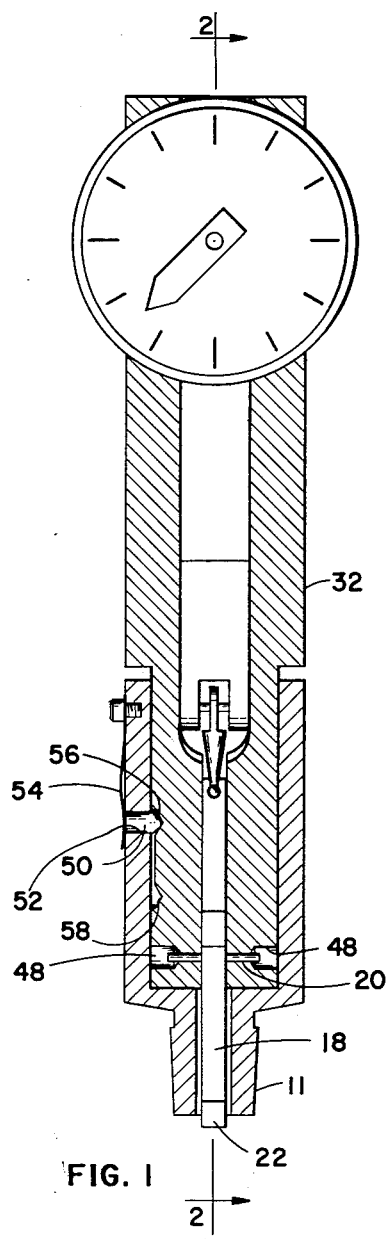

May 23, 1961  N. B. HAGAR  2,984,911

GAGES

Filed Oct. 15, 1958

INVENTOR.
NORMAN B. HAGAR
BY
ATTORNEY

United States Patent Office 2,984,911
Patented May 23, 1961

2,984,911

GAGES

Norman B. Hagar, Davenport, Iowa, assignor to The Bendix Corporation, a corporation of Delaware Filed Oct. 15, 1958, Ser. No. 767,429

5 Claims. (Cl. 33—199)

This invention relates to improvements in gages for measuring deviations from desired shapes, and an object of the invention is to provide improved gages for this purpose.

While not limited thereto, the invention is especially applicable to thread gages and will be described in detail in this application. It is an object of the invention to provide an accurate gage capable of measuring deviations from one or more of desired thread diameter, taper and concentricity.

In certain uses for threaded elements, the importance of variations in thread diameter, taper or concentricity warrants individual inspection of one or more of these factors in every threaded member. In an aircraft or missile, for example, failure at the threaded connection of a conduit or component could be very serious indeed and it is standard industrial and military practice to attempt to gage each thread. Another object is to provide means in a single instrument for measuring some of the important dimensional characteristics of threads.

While not limited to measurement of internal threads, another object is to provide an instrument for measuring internal threads which have heretofore been the most difficult to gage.

Accordingly, the embodiment of the invention selected for illustration and shown in the accompanying drawing is an internal thread gage, it being understood that various modifications in this embodiment and other embodiments of the invention are possible within the spirit of the invention and the scope of the appended claims.

Figure 2:
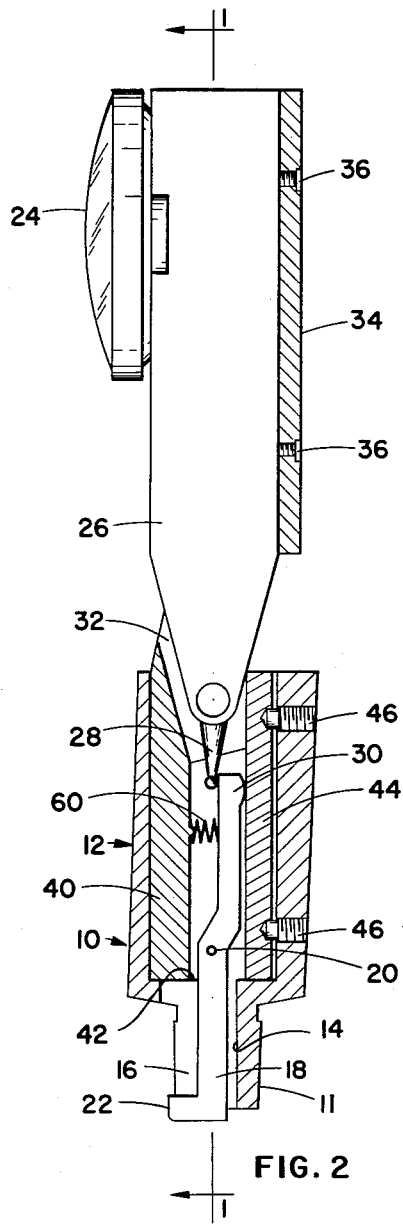

In the drawing:

Fig. 1 is a partly sectional view taken on line 1—1 of Fig. 2, of a gage embodying the invention, the lever and indicator being shown in front elevation; and Fig. 2 is a partly sectional view taken on line 2—2 of Fig. 1 and in which the lever and indicator are shown in side elevation.

In the invention there is provided a member having a surface formed as the converse of the shape desired in the member to be gaged. When the gage is intended to measure deviations from a desired thread shape, this member comprises a plug member to fit over external threads or within internal threads. Where, as in the embodiment selected for illustration, internal threads are to be gaged, said member advantageously comprises a generally cylindrical plug having diameter and taper corresponding to the minor diameter and taper desired in the thread. Such a plug member is shown designated 10. It has a plug portion 11 and an enlarged extension 12 and both the plug and extension are hollow, having an axial opening 14 extending therethrough. A cutout 16 is formed in one side wall of the plug 11. This cutout extends to communication with opening 14 and advantageously is elongated to extend over the length of the plug 11, as shown.

An element is provided which has a portion extendable through the cutout into contact with the member being gaged and this element advantageously comprises a rotatable lever 18 pivoted on a pivot pin 20 whose axis is fixed at a selected one of a number of positions relative to plug member 10. One end 22 of the lever 18 is disposed in plug cutout 16 and is offset laterally from the lever whereby upon rotation of the lever about pivot 20, end 22 is moved beyond the outer circumference of plug 11.

Means are provided for determining the degree of extension of said element beyond the conversely formed gaging surface, here the projection past cutout 16 of the outer circumference of plug 11. This means may comprise means for determining the degree of rotation of lever 18 and preferably comprises a conventional dial indicator of common type which is actuated by a movable feeler. Such a dial indicator is shown, and comprises a dial 24, a body 26 and a feeler 28. Lever 18 is extended to a second end 30 which engages feeler 28, rotating the feeler when the lever is rotated about pin 20.

It is a feature of the invention, as applied to thread gaging, that the thread may be gaged at spaced points along the length of the threaded area. This is accomplished in this embodiment by means for moving the indicator feeler, the lever and the lever pivot pin relative to the plug 11 but not relative to one another. The means by which this is accomplished comprises a carrier 32 having an upper end 34 of any convenient shape to hold and protect the indicator body 26. The body 26 is secured to the carrier by any convenient means such as the machine screws 36.

The lower end 40 of carrier 32 is formed generally as a segment of a hollow cylinder slidable within the enlargement of axial opening 14 in extension 12 into abutting relation with the inner bottom 42 of extension 12 formed at the change in diameter of opening 14. Relative rotation and movement between the carrier 32 and plug member 10, except relative axial sliding movement, is prevented by any convenient means such as jib 44 which is disposed in opening 14 between the wall of extension 12 and the carrier 32 where it abuts the side wall ends of the cylindrical segment 40. The jib 44 may be held in position by adjusting screws 46 as shown.

The indicator feeler 28 is disposed within the cylindrical carrier segment 40 along with the upper portion of lever 18, the pivot pin 20 being held near the lower end of segment 40 by being press-fitted in stepped openings 48 in the walls of segment 40. When these elements are assembled, as shown in the drawing, end 22 is disposed in cutout 16 at its lower end.

Carrier 32 may be moved relative to plug member 10 in the direction to withdraw segment 40 from extension 12, carrying with it the indicator feeler, lever and pivot pin whereby the lower end 22 of lever 18 is moved up in cutout 16 without change in the relative position of end 22, pin 20 and feeler 28.

Provision is made for fixing the degree of insertion of cylinder 40 of carrier 32 in plug extension 12. Advantageously, a detent mechanism is employed comprising a detent member 50 slidable in an opening 52 in extension 12 so that its end may be moved, in response to bias applied by detent spring 54, into recess 56 or 58 formed in cylinder 40 of carrier 32. Recesses 56 and 58 are spaced such that when they are engaged by the detent member, lever end 22 is disposed near the bottom and top, respectively, of plug cutout 16.

A bias spring 60, held under compression and bearing at one end against the inner wall of cylinder 40 and at the other end against the upper end 30 of lever 18, operates to urge the lower lever end 22 toward a position without the projected circumference of plug 11. The degree of this projection is limited by abutment of the upper end 30 of lever 18 against jib 44. The dial indicator includes means for biasing its feeler 28 against the upper lever end 30 and it further comprises means for adjusting the pointer hand of the indicator dial to read zero, when feeler 28 is moved to the position in which lever end 22 is flush with the projected circumference of plug 11.

In operation of the device, plug 11 is inserted and seated within the threads of an internally threaded member and the lower cylindrical portion 40 of carrier 32 is inserted within extension 12 of the plug member 10 until the detent member 50 is engaged in detent recess 56. The entire gage assembly is then rocked clockwise and counterclockwise relative to the threaded member in the plane of rotation of lever 18. If the minor diameter of the thread being engaged is greater than the diameter of the lower end of plug 11 then end 22 of lever 18 will move outwardly from cutout 16, because of the force applied by spring 60 to the upper end of the lever, beyond the projected circumference of the lower end of plug 11 by an amount equal to the difference between the plug diameter and the minor thread diameter. The amount of this extension, since it results from rotation of lever 18, is reproduced in rotational movement of the opposite end 30 of lever 18. Movement of lever end 30 permits movement of the spring biased feeler 28 of the dial indicator resulting in corresponding movement of the hand of dial 24.

Concentricity of the threads may be gaged by comparing this reading with a reading taken in similar fashion after rotation of the dial indicator assembly relative to the threaded member being gaged.

To measure minor thread diameter and concentricity of the opposite end of the thread portion of the member being gaged, the steps described are repeated after withdrawal of carrier 32 from plug member 10 until detent member 50 is disposed in the recess 58.

By such procedures errors in thread taper, minor diameter and concentricity can be determined with the instrument.

I claim:

1. An internal thread gage comprising a plug formed with side walls having the diameter and taper desired in the minor diameter of the threads to be gaged, said plug having an extension and the whole having an axial opening, the plug having a cutout formed through a side wall thereof communicating with said opening, a carrier insertable in the extension of the plug, an indicator mounted on said carrier and having a feeler movable to actuate said indicator and a lever pivotally carried by said carrier and having an end engageable with said feeler and a second end formed to be rotatably extendable through the cutout of the plug.

2. A thread gage comprising a plug member having side walls of the diameter and taper desired in the threads to be gaged and having a cutout formed in one of said side walls, a lever rotatable about a point relative to said plug member and having one end disposed in and rotatable out of said cutout, means for altering the point about which said lever is rotatable relative to said plug member whereby the amount of any rotation of said lever to carry said one end out of the cutout may be determined at spaced points along said plug member, and means for indicating the amount of any rotation of said lever out of said cutout.

3. A thread gage comprising a plug member having side walls of the diameter and taper desired in the threads to be gaged and having a cutout formed in one of its side walls, a lever rotatable about a point relative to said plug member, an indicator carried by said plug member having a movable feeler whose movements are indicated, said lever engaging said feeler and having one end disposed in and rotatable out of said cutout, said feeler and said lever and the pivot point of the lever being movable together relative to said plug member such that said one end of the lever is rotatable out of said cutout at selected points along said plug.

4. The invention defined in claim 3 in which said plug member is hollow, and including a carrier member to which said indicator, pivot, and rotatable lever are fixed, said carrier being insertable within said plug.

5. The invention defined in claim 4 including detent means for securing said plug member and carrier against relative movement at a preselected degree of insertion of said carrier into said plug member.

References Cited in the file of this patent

UNITED STATES PATENTS

| | | |
|---|---|---|
| 1,583,208 | Walker et al. | May 4, 1926 |
| 2,735,187 | Grobey | Feb. 21, 1956 |
| 2,736,103 | Kahle | Feb. 28, 1956 |